US00RE35440E

United States Patent [19]

Starvaski

[11] E Patent Number: Re. 35,440

[45] Reissued Date of Patent: Feb. 4, 1997

[54] LOOP DISTRIBUTOR FOR REFORMING STATION

[75] Inventor: Raymond R. Starvaski, Worcester, Mass.

[73] Assignee: Morgan Construction Company, Worcester, Mass.

[21] Appl. No.: 374,063

[22] Filed: Jan. 19, 1995

Related U.S. Patent Documents

Reissue of:

[64] Patent No.: 5,273,231
Issued: Dec. 28, 1993
Appl. No.: 924,146
Filed: Aug. 3, 1992

[51] Int. Cl.[6] ..... B21C 47/02

[52] U.S. Cl. ..... 242/363

[58] Field of Search ..... 242/360–363; 140/1, 2; 72/134

[56] References Cited

U.S. PATENT DOCUMENTS

| | | | |
|---|---|---|---|
| Re. 26,052 | 6/1966 | Crum | 140/2 |
| 3,176,385 | 4/1965 | Morgan et al. | 242/361.5 |
| 3,496,966 | 2/1970 | Reth et al. | 242/361.3 |
| 4,437,620 | 3/1984 | Ozawa | 242/363 |
| 5,143,315 | 9/1992 | Faessel et al. | 242/360 |

FOREIGN PATENT DOCUMENTS

| | | |
|---|---|---|
| 687078 | 3/1967 | Belgium . |
| 1235100 | 2/1967 | Germany . |
| 2102684 | 11/1972 | Germany . |
| 53-131948 | 11/1978 | Japan . |
| 1160488 | 8/1969 | United Kingdom . |

*Primary Examiner*—John M. Jillions
*Attorney, Agent, or Firm*—Samuels, Gauthier, Stevens & Reppert

[57] ABSTRACT

A rolling mill reforming station has an annular chamber into which rings are dropped to accumulate in coil form. A guide member is rotated about a circular path surrounding the path of ring descent. The guide member has a three dimensionally [curved] *shaped* guide surface configured in the general shape of a plow share which distributes the descending rings around the circumference of the accumulating coil.

4 Claims, 5 Drawing Sheets

LOOP DISTRIBUTOR FOR REFORMING STATION

Matter enclosed in heavy brackets [ ] appears in the original patent but forms no part of this reissue specification; matter printed in italics indicates the additions made by reissue.

BACKGROUND OF THE INVENTION

1. Field of The Invention

This invention relates generally to reforming stations in a wire rod mill, and is concerned in particular with an improved means for distributing wire rod loops as they are being received from the delivery end of a cooling conveyor and accumulated in coil form.

2. Description of the Prior Art

In a typical wire rod mill installation, as indicated schematically in FIG. 1, billets are reheated in a furnace 10, and then are continuously hot rolled through roughing, intermediate and finishing sections 12, 14 and 16 of the mill. The finished wire rod is then preliminarily cooled in water boxes 18 before being formed into loops L by a laying head 20. The loops are received in an overlappang arrangement on a cooling conveyor 22 where they are subjected to further controlled cooling. Thereafter, the loops drop from the delivery end of the conveyor into a reforming station 24 where they are gathered into upstanding cylindrical coils. The coils are then compacted, banded and transferred to other locations (not shown) for further processing or shipment to off site customers.

As the loops drop into the reforming station, their orientation with respect to each other has an effect on the shape and size of the resulting coil. For example, if the loops are allowed to pile up at one side, the coil is likely to be lopsided and unstable. It is desirable, therefore, to achieve a uniform distribution of successive loops around the circumference of the coil as it is being formed. In this way, the coil takes on a more stable configuration, and subsequent compaction will result in increased density, thereby minimizing the space occupied by the coils during transit and storage.

U.S. Pat. No. Re. 26,052 discloses one attempt at achieving improved loop distribution through the use of a rotating deflector arm extending radially inwardly towards the center of the reforming chamber, with its innermost surface spaced from the opposite side of the chamber by a distance substantially equal to the diameter of the descending loops. Theoretically, this arrangement can operate satisfactorily as long as the loops follow a more or less constant path of descent. However, under actual operating conditions in a rolling mill environment, the loops can and often do stray from one path, thus presenting a danger that they will hang up on the arm. When this occurs, subsequent loops will rapidly pile up above the rotating arm, the result being an uncontrolled tangle necessitating a complete shutdown.

SUMMARY OF THE INVENTION

A general objective of the present invention is to achieve improved loop distribution during the coil forming operation, without the attendant drawbacks of the prior art.

A more specific objective of the present invention is to provide a rotating three dimensionally [curved] *shaped* deflector which is configured to accommodate smooth descent of the loops into the reforming chamber while insuring that the loops are laterally shifted into an ordered pattern around the circumference of the coil, thereby promoting coil density and stability.

These and other objects and advantages are achieved by continuously rotating a guide member having a three dimensionally [curved] *shaped* guide surface around a circular path surrounding the path of loop descent. The guide surface is configured in the general shape of a plow share, preferably comprising a segment of the interior surface of an inverted hollow cone. The upper edge of the guide surface extends around a segment of its circular path of travel, with a rear edge extending downwardly therefrom to a lower end, and then upwardly at an angle with respect to the rear edge to form a leading edge terminating back at the upper edge at a front end. The guide surface extends into the path of loop descent. and is thus arranged to be slidingly contacted by the descending loops. A first distance measured from the [lower] *front upper* end of the guide surface through the center of the reforming chamber to the opposite chamber side is approximately equal to the chamber diameter, and greater than a second distance measured from the lower end of the guide surface through the center of the reforming chamber to the opposite chamber side. The front end of the guide surface is located in a plane spaced vertically above that of the lower end, with the second distance being greater than the diameter of the loops. As the loops come into contact with the rotating guide surface, they are smoothly and uniformly distributed around the circumference of the accumulating coil.

DETAILED DESCRIPTION OF PREFERRED EMBODIMENT

Figure 1:
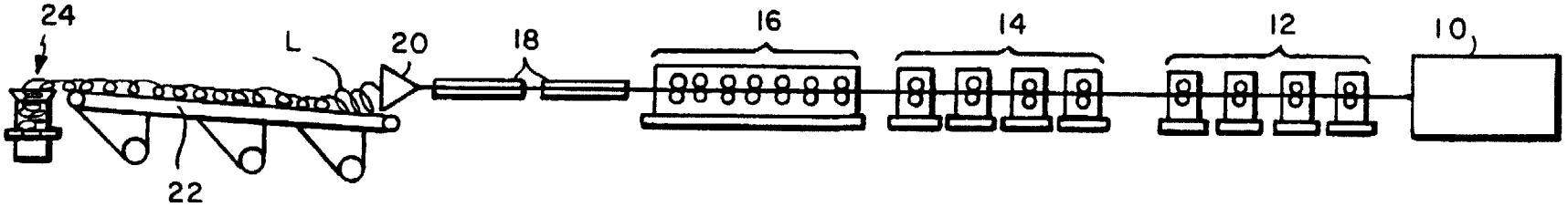
FIG. 1 is a diagrammatic illustration of a conventional wire rod mill.
Figure 6:
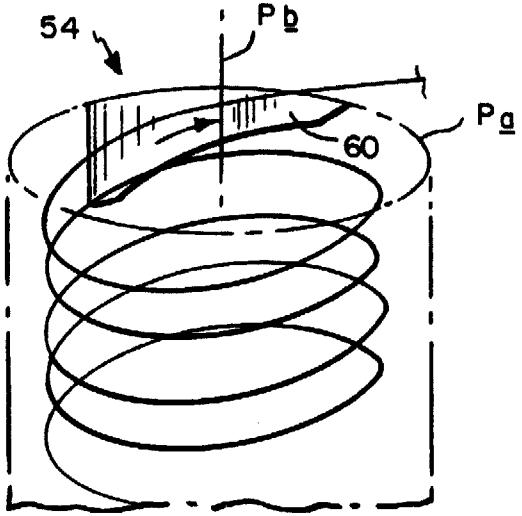
FIG. 6 is a illustration depicting the general position of the wide surface and its circular path of travel in relation to the path of loop descent into the reforming chamber.
Figure 2:
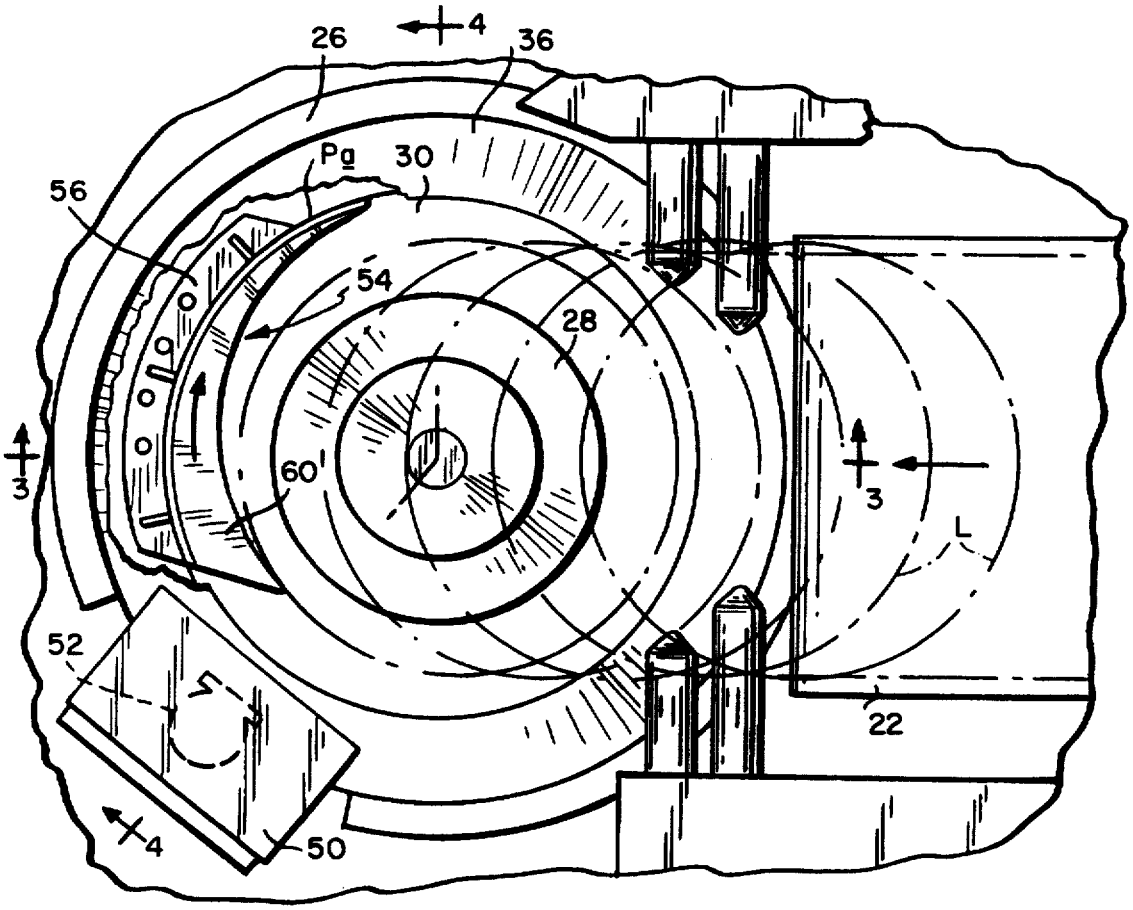
FIG. 2 is a plan view of an enlarged scale looking down into a reforming station the type employing a loop distributing device according to the present invention.
Figure 3:
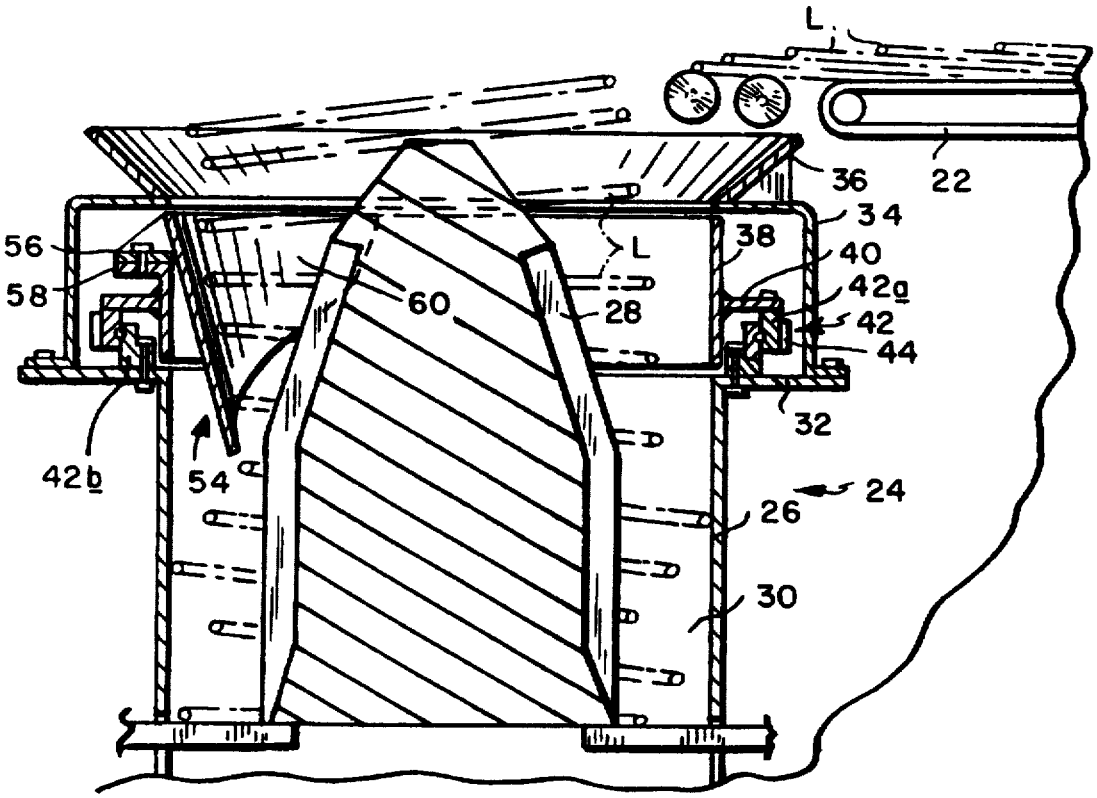
FIGS. 3 and 4 are sectional views taken respectively along lines 3—3 and 4—4 of FIG. 2.
Figure 4:
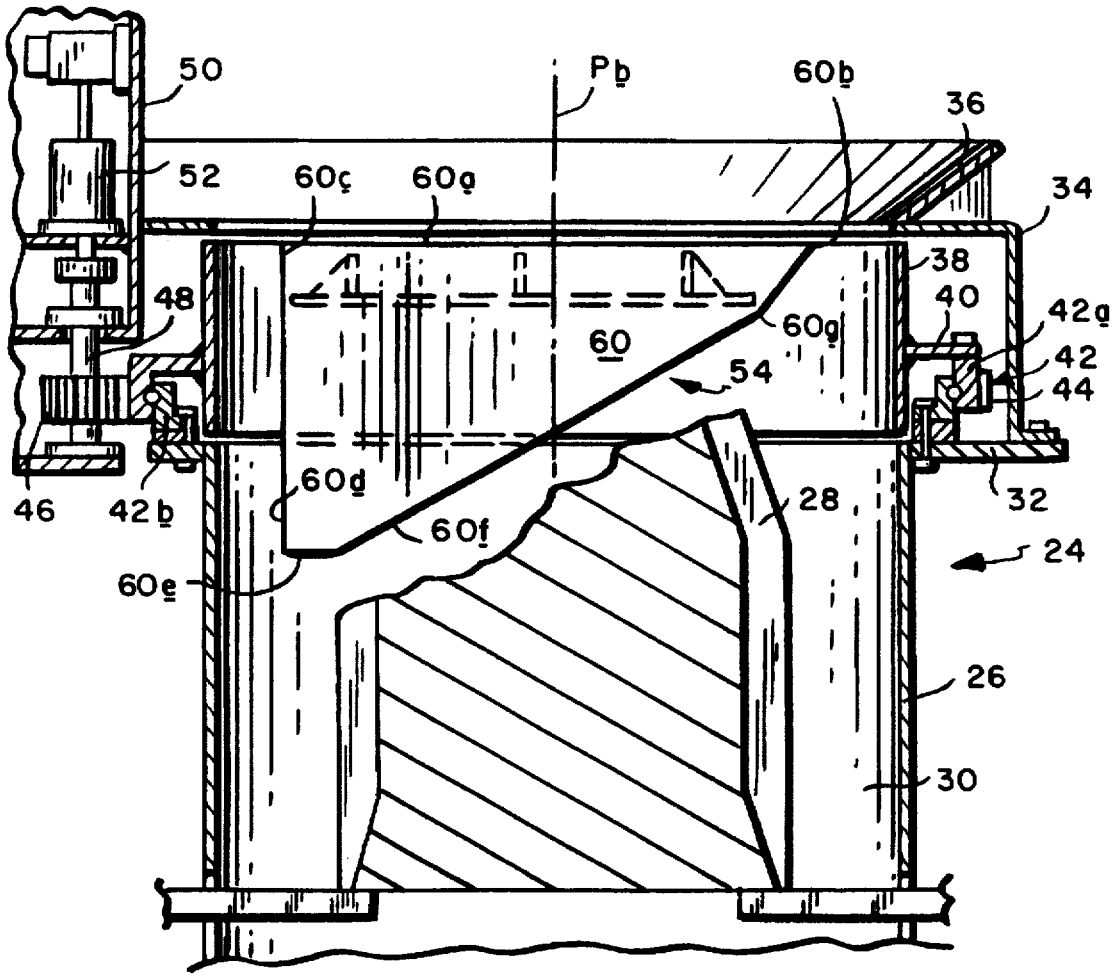

With reference initially to FIGS. 2–4, the reforming station 24 is shown comprising a cylindrical stationary tub 26 cooperating with an upstanding center guide 28 to define an annular coil forming chamber 30. A horizontal shelf 32 surrounds the exterior of the tub. Shelf 32 supports bracket 34 which in turn carries a truncated conical entry port 36 through which the loops L, are received from the delivery end of the conveyor 22. A cylindrical sleeve 38 is interposed between the upper end of the tub 26 and the bottom end of the entry port 36. Sleeve 38 has a radially outwardly extending circular bracket 40 carrying the outer race 42a of a circular roller bearing 42, the inner race 42b of the bearing being mounted to the shelf 32. The outer race 42a has teeth 44 engageable with a pinion 46 carried on a shaft 48 protruding downwardly from a drive housing 50 secured to the bracket 34. A motor 52 within the drive housing 50 is coupled to the shaft 48 and serves as the means for rotatably driving the sleeve 38. The upper edge of the sleeve defines a circular path $P_a$ surrounding the path $P_b$ of loop descent into the annual chamber 30. The relationship of the circular path $P_a$ to the path $P_b$ loop descent is schematically depicted in FIG. 6.

Figure 5:
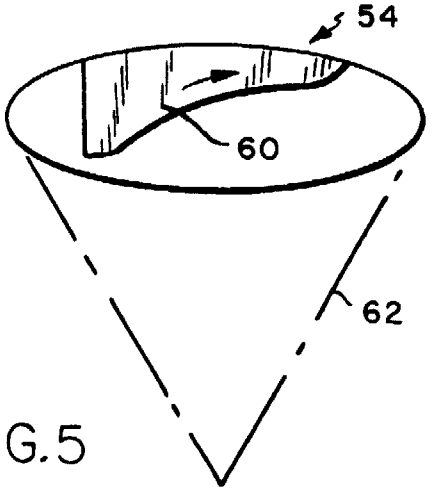
FIG. 5 is a diagrammatic illustration depicting the three dimensionally [curved] *shaped* guide surface of the present invention as a segment of the interior surface of an inverted hollow cone.

A guide member 54 is mounted by means of an external bracket 56 to a lip 58 on the sleeve 38 for rotation therewith. The guide member 54 has a three dimensionally [curved] *shaped* guide surface 60 exetnding into the path of loop descent. As can best be seen in FIG. 5, the guide surface 60 preferably defines a segment of the interior of an inverted hollow reference cone 62.

With reference in particular to FIG. 4, it will be seen that the guide surface 60 has a top edge 60a extending from a front end 60b to a rear end 60c along a segment of the circular path $P_a$. A trailing edge 60d extends downwardly from the rear end 60c to a lower end 60c. A leading edge 60f extends upwardly from the lower end 60e and angularly with respect to the trailing edge 60d to the front end 60b. Preferably, the slope of the leading edge 60f changes at 60g to define a more sharply angled portion adjacent to the front end 60b.

Figure 7:
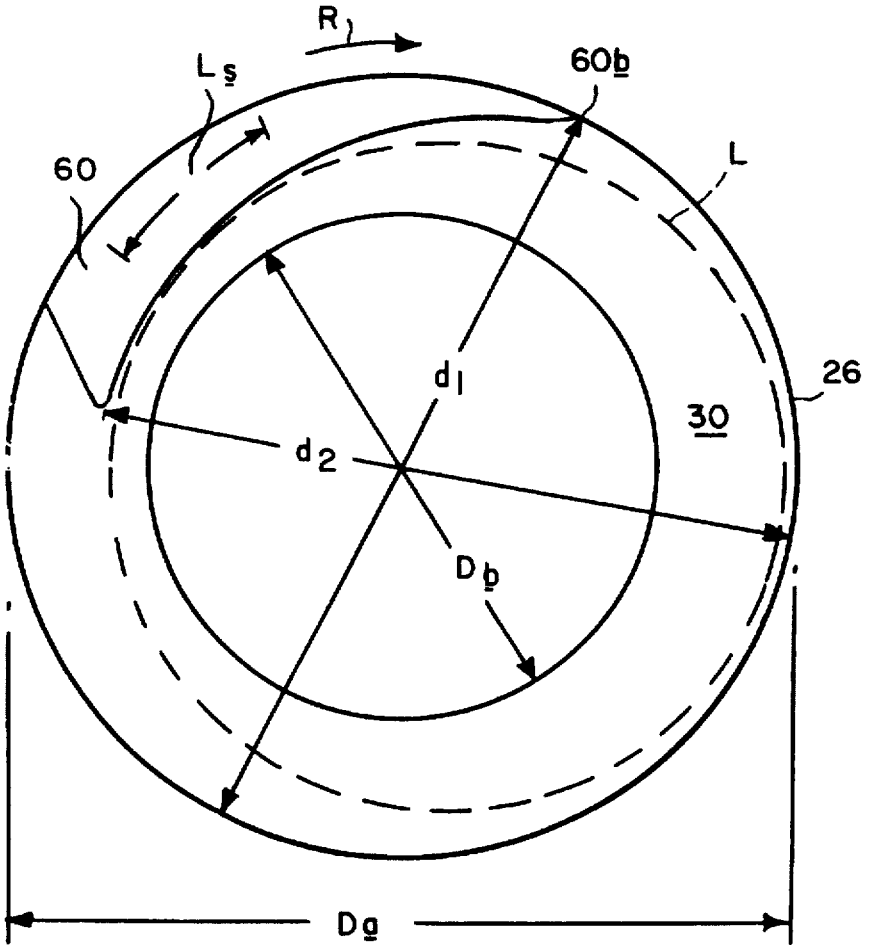
FIG. 7 is a diagrammatic illustration of the dimensional relationship of various components.

With reference to FIG. 7, it will be seen that the leading end 60b of the guide surface 60 is spaced from the opposite surface of the tub 26 by a first distance $d_1$, which is approximately equal to the outer diameter $D_a$ of the annular reforming chamber 30. The lower end 60e of guide surface 60 is spaced from the inner tub diameter by a second distance $d_2$which is less than $d_1$, but somewhat greater than the diameter of the loops L being received in the chamber. Preferably, $$d_2 = \frac{D_a - D_b}{2} - D_b - C$$

Where:

$D_a$=outer diameter of chamber 30

$D_b$=inner diameter of chamber 30 c=clearance constant

Figure 8:
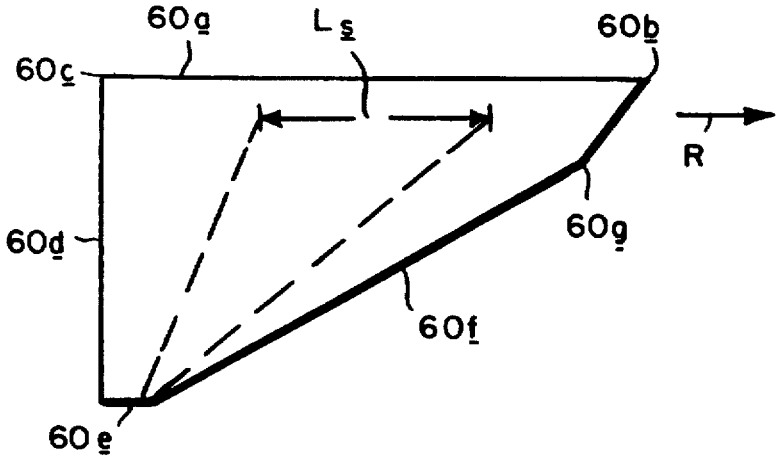
FIG. 8 is another diagrammatic illustrations of the guiding action provided by the guide surface.

With this arrangement, as each loop descends into the reforming chamber, it will fall free of the leading end 60b of the guide surface, with initial contact with the guide surface occuring behind the leading end and below the upper edge 60a, typically along a peripheral segment of the loop indicated schematically in FIG. 7 as well as in FIG. 8 at $L_5$. As the loop slides downwardly across the guide surface 60, and the guide surface is rotated in the direction R, the peripheral segment $L_5$ will gradually diminish until the loop falls free of the lower end $60_e$. The net result is that the loop is gradually and smoothly urged away from the guide surface towards the opposite surface of the tub wall. By contacting each loop along a peripheral segment, the loops are prevented from rolling across the guide surface and thus disturbing the guiding action. This effect is imparted to successive loops as the guide surface continues to rotate around the circumference of the tub, thus producing a uniform distribution of rings in a controlled overlapping relationship. The front end 60b of the guide surface remains outboard of the descending loops, which insures that leading edge 60f does not come into damaging contact with the loops.

I claim:

1. In an apparatus for receiving a series of loops descending along a vertical path from a delivery device, and for accumulating the thus received loops in the form of an annular coil, a device for horizontally distributing the loops as they descend into the apparatus, said device comprising:

a) means defining a circular path surrounding said vertical path;

b) a [curved] *rotatable* guide member having a three dimensionally *shaped* guide face [formed as a segment of the interior surface of an inverted hollow cone], said guide face having: (i) a top edge extending from a front end to a rear end along a segment *of* said circular path; (ii) a trailing edge extending downwardly from said rear end to a lower end; and (iii) a leading edge extending upwardly from said lower end and angularly with respect to said trailing edge to said front end, said guide face *extending into said vertical path and* being arranged to be contacted by and to horizontally deflect the descending loops away from *the said segment of* said circular path; and c) means for rotating said guide member around said circular path to circumferentially distribute the thus deflected loops around the axis of the accumulating annular coil.

2. The device as claimed in claim 1 wherein said circular path defines the upper end of a cylindrical enclosure within which the annular coil is accumulated, said front end being spaced from the opposite interior surface of said enclosure by a first distance which is approximately equal to the inner diameter of said enclosures, said lower end being spaced from the opposite interior surface of said enclosure by a second distance which is less than said first distance.

3. The device is claimed in claim 2 wherein a guide element is disposed centrally within said enclosure to cooperate therewith in defining an annular chamber for receiving said loops, and wherein said second distance ($d_2$) is measured as:

$$d_2 = \frac{D_a - D_b}{2} + D_b + C$$

where:

$D_a$=is the outer diameter of said chamber $D_b$=is the inner diameter of said chamber C=is a clearance constant

*4. The device as claimed in claim 1 wherein said guide face is formed as a segment of the interior surface of an inverted hollow cone.*

* * * * *